United States Patent [19]

Bosswell et al.

[11] Patent Number: 5,067,554
[45] Date of Patent: Nov. 26, 1991

[54] MELT EXTRACTION OF CERAMICS

[75] Inventors: Peter Bosswell, Acacias; Dag Richter, Carouge; Tatjana Berce, Geneva; Guy Negaty-Hindi, Onex, all of Switzerland

[73] Assignee: Battelle Development Corporation, Columbus, Ohio

[21] Appl. No.: 359,674

[22] PCT Filed: Apr. 11, 1988

[86] PCT No.: PCT/US88/01249
§ 371 Date: Dec. 9, 1988
§ 102(e) Date: Dec. 9, 1988

[87] PCT Pub. No.: WO88/07979
PCT Pub. Date: Oct. 20, 1988

[30] Foreign Application Priority Data
Apr. 10, 1987 [CH] Switzerland .............. 01385/87

[51] Int. Cl.⁵ ............................. B22D 11/06
[52] U.S. Cl. ........................... 164/463; 164/469; 164/423; 164/508

[58] Field of Search ............... 164/423, 463, 429, 479, 164/136, 469–471, 493–495, 506–508, 512–514; 264/5, 8, 164; 425/6, 8

[56] References Cited

U.S. PATENT DOCUMENTS

| 3,838,185 | 9/1974 | Maringer et al. | 164/463 |
| 3,863,700 | 2/1975 | Bedell et al. | 164/463 |
| 4,582,116 | 4/1986 | Ray et al. | 164/463 |
| 4,705,656 | 11/1987 | Onoyama et al. | 425/8 |

Primary Examiner—Kuang Y. Lin
Attorney, Agent, or Firm—Barry S. Bissell

[57] ABSTRACT

The pool to be filamented is liquefied by heating in a crucible. A disk having an edge immersed in the molten pool rotates at high velocity and drives the pool outwards in the form of a ribbon which breaks up into pieces forming the required particles. The portion of the pool in contact with the disk is constantly replenished and, owing to the use of heating means, has sufficient fluidity to satisfy the conditions for extraction, the molten pool being continuously moved horizontally with respect to the disk.

10 Claims, 2 Drawing Sheets

MELT EXTRACTION OF CERAMICS

The invention relates to a method of using the "centrifugal melt extraction" technique for producing mineral fibres and powder, inter alia solidified filaments from mineral materials such as metal oxides, carbides, nitrides, borides or the like, and obtained from these materials in the molten state and in the form of a relatively viscous liquid pool.

This kind of technique is known and used for easily-melting materials which flow easily when hot, e.g. certain metals and alloys and certain salts or metal derivatives having properties, when molten, near those of the metals themselves.

For example document U.S. Pat. No. 3,838,158 (MARINGER) describes a method of obtaining filaments by solidification of films from a molten material having a viscosity not exceeding one poise and a surface tension of 0.25 N/m, the material comprising metals and alloys, inter alia Sn, Zn, Cu, Ni, Al, Al bronze, Fe, steel, stainless steel, etc. and inorganic substances inter alia alkali-metal nitrates which have properties, when molten, similar to those of metals.

This method, which is defined by the terms "centrifugal extraction from a molten pool" (melt-extraction method) comprises the following successive steps:

(a) heating with appropriate heating means said mineral material to melt it into a pool of liquid molten material;

b) immersing into said pool the rim of a metal or ceramic extraction disk, with a V-shaped peripheral edge to a depth sufficient to ensure a superficial contact between said periphery and the liquid;

c) rotating the disk around an axis parallel to, or slightly sloped relative to, the liquid surface at a speed sufficient for providing a skimming action of said liquid by said rim and freezing said liquid with a film-like strip which first adheres to the surface of the rim and then is expelled away from the disk by the centrifugal force in the form of the desired said filaments, fibres on particles which can then be collected.

Document U.S. Pat. No. 4,397,623 describes a device, using an effect apparently similar to that in the preceding document, for extracting the molten material from a bath of molten mineral material (inter alia blast-furnace slag or basalt) in the form of solidified filaments. The device comprises a set of disks immersed in the molten pool and driven rapidly in revolution. It is found, however, that the depth at which the disks are immersed is excessive and cannot give a thin film of solidified product adhering to the disk periphery. The document states (see e.g. column 3, lines 9-14) that the rotation of the disks expels molten material in the form of droplets or filaments of liquid which are laterally entrained by a stream of air and converted to fibres by the lateral air stream.

Similar or related techniques are described by the following documents: U.S. Pat. No. 3,896,203, U.S. Pat. No. 3,938,583; U.S. Pat. No. 4,154,284; FR-A-2 519 418.

Although the technique described in document U.S. Pat. No. 3,838,185 is very efficient for manufacturing metal fibres a few μm in thickness and from a few μm to a few cm in length, it is not directly suitable for manufacturing fibres from molten material having a viscosity, in the molten state, which is normally from a few poises to a few hundred poises, in which case the materials are viscous liquids having reduced mobility and tending to thicken at rest (thixotropy). The inventors therefore have tried to remedy this situation and modify the process described in the aforementioned document in order to obviate the aforementioned problems.

They have finally succeeded by the methods summarised in claim 1.

The invention will be more clearly understood from the following description with reference to the accompanying drawings in which.

Figure 1:
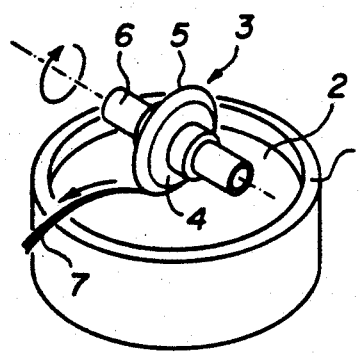
FIG. 1 is a diagram showing the basic features of the "melt extraction" technique.

The device diagrammatically shown in FIG. 1 for illustrating the prior art comprises a crucible 1 containing a molten metal in liquid form 2. A disk 3 having a peripheral part 4 made up of two truncated cones joined by their base and bounding an edge 5, touches the surface of the molten metal with the edge 5. In contact therewith, a film of solidified metal forms and is deposited on the peripheral area 4 from which it is expelled by the centrifugal force produced by rotation of the disk around a shaft 6. A ribbon of solidified metal 7 which becomes detached from the edge of the disk when the angle of rotation, counting from the place of contact between the disk and the liquid, is approximately 20° to 90°, is expelled to a distance and, if it strikes any object in its path (e.g. a screen or laboratory chamber wall) it breaks up into metal fibres which can then be collected. These fibres are of use in all conventional applications, inter alia for manufacturing catalysts, sintering, metal pigments, conductive particles, reinforcement of cast objects, etc.

The device, however, is unsuitable for manufacturing fibres from a molten pool having high viscosity or at least having a viscosity which varies considerably with temperature as in the case of metal oxides, glass, cermaics, cermets, carbides, nitrides, silicides, borides, titanates, tungstates, zirconates etc. The reason is that if the molten pool is to have sufficient fluidity in its area of contact with the extraction disks, the pool has to be kept in motion and the heating means must be disposed as near as possible to the extraction area to prevent cooling (a natural result of motion between the heating region and the extraction area) from being excessive and unduly increasing the viscosity. The device shown in FIG. 2 can achieve the aforementioned aims. The device comprises a crucible 10 containing a pool of molten material 11, e.g. $ZrO_2$, $Al_2O_3$, $Fe_3O_4$, SiC, $Si_3N_3$, etc. The crucible, which is generally of metal e.g. copper, bronze, brass, iron, nickel or the like, rests with dry friction on a hollow base 12 likewise of metal and cooled by a cooling liquid flowing in ducts 13a (inlet) and 13b (outlet). the crucible is driven in rotation in the direction of the arrow by a vertical shaft 14 connected to a motor (not shown in the drawing). The heat produced by the molten pool 11 would destroy crucible 10 were it not for the cooling means 12, but is dissipated by conduction when crucible 10 rubs on base 12.

The need to heat the crucible can be avoided (since this need is an additional constraint since the molten pool has to be kept sufficiently fluid in the extraction zone) if the crucible is made of refractory material provided that the material does not react at the melting temperatures with the molten pool and is compatible with the heating means used. If, for example, as in the embodiment now being described, arc or plasma heating is used and consequently the crucible has to be electrically conductive, the crucible can be made of an electrically conductive refractory, e.g. an electrically conductive carbide or nitride. A variant of this kind is indicated when the material to be converted into fibre is also a carbide or nitride, in which case the crucible can be made of the same or similar material as the molten pool. In such cases, of course, the heating means must be adjusted so as not to melt the crucible at the same time as the molten material to be filamented.

Figure 2:
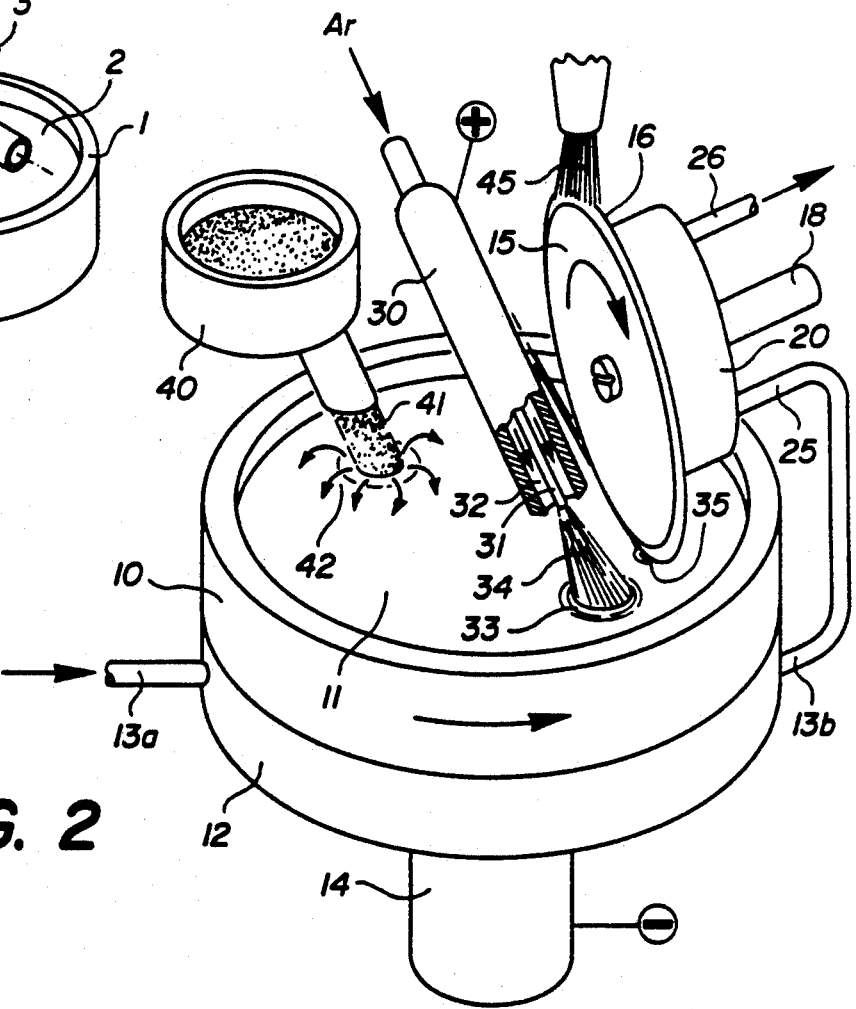
FIG. 2 is a diagrammatic perspective view, partly cut away, of a device for working the method according to the invention.
Figure 3:
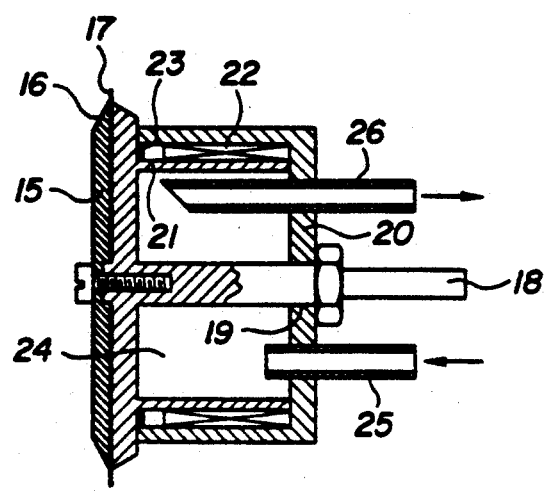
FIG. 3 is a diametrical diagrammatic section through a detail of the device in FIG. 1.

To return to the embodiment of the device in FIG. 2, the device also comprises an extraction disk 15, usually of copper, aluminium, bronze, iron or the like and having a bevelled peripheral area 16 the surfaces of which form a V at an angle of about 20° to 80°. A disk 17 (see FIG. 3) greater in diameter than the edge formed by the V surfaces may optionally be inserted between the two truncated cones constituting the disk 15. The thickness of disk 17 can be of the order of 0.1 to 1 mm.

Disk 16 is secured to a shaft 18 driven by a motor (not shown) and sliding in a bearing surface 19 of a fixed mandrel 20. Disk 15, the cylindrical inner portion 21 of which fits into mandrel 20, rotates inside the mandrel via a set of needle bearings 22 inserted between the inner walls of mandrel 20 and the periphery of cylinder 21. An annular seal 23 seals the compartment 24 formed inside mandrel 20, the compartment being supplied with cooling liquid (e.g. tap water) via ducts 25 (inlet) and 26 (outlet). The heat produced in the disk by contact with the molten pool 11 can be evacuated by the aforementioned means.

Disk 15 and the components thereof can be made of copper or a copper alloy which is a good conductor of heat. Alternatively the disk can be made of other metals, depending of the nature of the molten pool to be filamented. The disk may also be made of ceramic (Al$_2$O$_3$) or cermet as needed. Cooling may be unnecessary in certain cases if the disk is made of material having a sufficiently high melting point to operate at high temperatures without disadvantage.

The device also comprises heating means, which in this embodiment are specifically a plasma torch 30. The torch comprises an axial electrode 31 separated from the torch walls by an annular duct 32 in which an ionisation gas, e.g. argon, is conveyed. The torch is brought to a potential with respect to the crucible, as diagrammatically indicated by the positive and negative terminals, so that a discharge 34 occurs in the gas ejected by the torch and striking the area 32 of the molten pool 11, and converts the pool into a fluid. The plasma-discharge fluidisation area 33 is disposed upstream of the area of contact 35 between the liquid and the disk edge 16, and is sufficiently near edge 16 for the fluidity to be retained while disk 10 rotates through an angle sufficient for the fluid in area 33 to reach the position of area 35. On the other hand, area 33 is sufficiently remote from disk 15 to avoid damage from the heat of torch 30. In practice, in the case of a copper disk 15 between 10 and 20 cm in diameter and dipping into a molten pool at 2000°-3000° C. in a crucible from 5 to 10 cm in diameter rotating at a few rpm, the distance between areas 33 and 35 is between a few mm and a few cm, e.g. from 5 mm to 5 cm.

The device also comprises a hopper 40 and a duct 41 for continuously replenishing the level of liquid in the crucible by supplying granular material to be filamented. The particles of this material fall in an area 42 of the bath which is preferably at a sufficient distance from disk 15 for the material to melt completely before it is brought to the extraction area 35 by rotation of crucible 10. Advantageously, therefore, area 42 is disposed in a part of bath 11 diametrically opposite to areas 33 and 35.

Preferably the peripheral speed of the annular part 16 of disk 15 which skims the surface of the molten pool is of the order of 1 to 20 m/sec. However this speed varies greatly with the nature of the material to be filamented and the viscosity of the liquid used for extraction.

As already mentioned, the material for extraction solidifies in a fraction of a second in contact with the disk edge 16 and forms a film which initially adheres to the surface and is subsequently expelled to a distance by centrifugal force. In the event that some residues of the film has not been expelled, the device provides a brush 45, e.g. made of metal wires e.g. of bronze or brass, which cleans the V edge of the disk and keeps its surface clean and polished.

The device described here can of course include the use of a number of disks operating in parallel or in succession, and the molten pool can be heated by a set of heating means disposed at a suitable distance from the disks and each adapted to control the fluidity of the material reaching one or more of the disks.

With regard to the means for heating the crucible, techniques involving a plasma torch or electric arc can be used, or heating means by induction or by Joule effect (electric resistance) or by gas, the means being chosen in dependence on the nature of the crucible (to be cooled or refractory), the nature of the material to be filamented and the melting point thereof.

Figure 4:
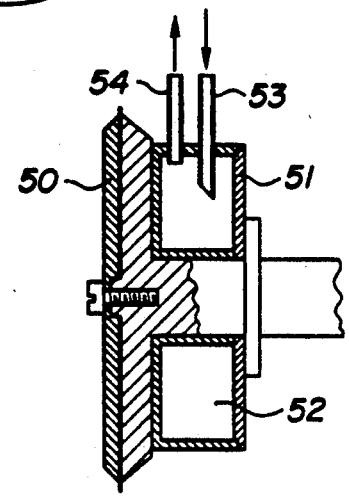
FIG. 4 is a diagrammatic section through a detail in a variant.

FIG. 4 shows a variant of the extraction disk which is cooled by a method very similar to that for crucible 10. The variant comprises a disk 50 practically identical with disk 15 in FIG. 3 and having a diameter which can vary between 72 mm and 122 mm but rotating in contact with a torus 51 constituting an annular cooling chamber 52 supplied with cooling liquid via ducts 53 and 54. The disk operates in identical manner to disk 15. In this embodiment, it was found that after 3 minutes of operation in a molten pool at 2000° C., the disk temperature did not exceed 400° C.

Figures 5, 6:
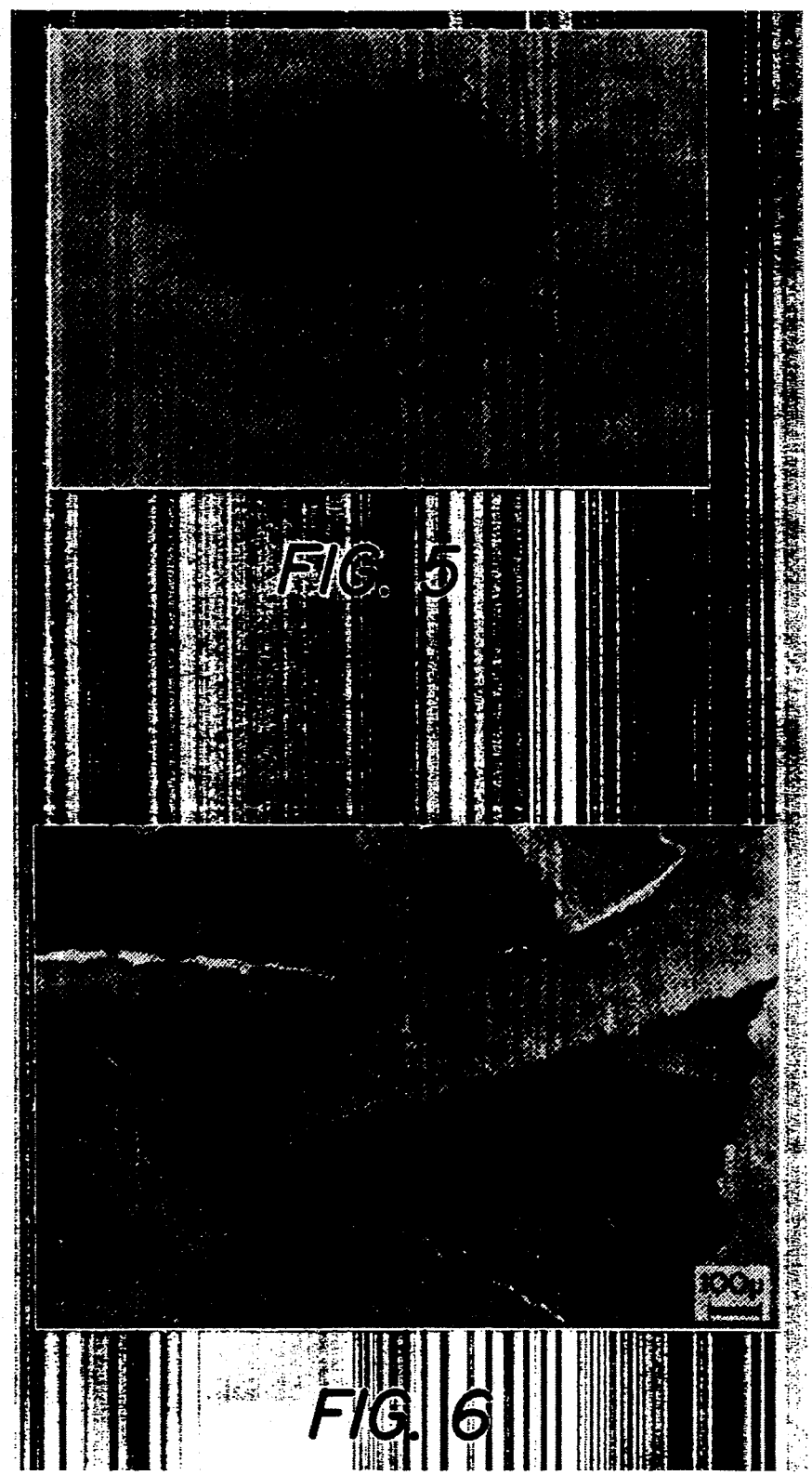
FIG. 5 shows a pile of mineral fibres obtained by working the method according to the invention.
FIG. 6 is a large-scale photograph of fibres obtained according to the invention.

In general, in order the work the method according to the invention by using the aforementioned device, a quantity of material for filamenting, in the form of powder or granules, is first placed in crucible 10, the crucible is set in rotation and the material is melted by plasma torch 30. Note that the torch can be replaced by a known electric arc. When the material has been melted, the torch is positioned at a suitable angle (e.g. between 20° and 80° to the vertical) so that area 33 is fixed at a suitable distance from the (desired) place of contact between the disk 15 and the molten pool. After disk 15 has been set in rotation, it is vertically lowered from the point of contact to a sufficient depth for extraction to occur under the desired conditions, yielding a product in accordance with the chosen standards. By way of example, FIG. 5 shows a mass of magnetite fibres collected after a few seconds of rotation by a copper disk 15 cm in diameter immersed to a depth of 3 mm in molten magnetite at about 1700° C. at air at ordinary pressure, and rotating at 200-2000 rpm. The fibers were about 0.5 to 3 cm long, 50 μm thick and 0.5 to 1 mm wide.

Of course, when the material to be filamented is combustible, e.g. a metal carbide or nitride, the operation is performed in a chamber under protection from a non-reactive gas, e.g. Ar, or $N_2$ in certain cases.

Note that, in order to heat the crucible, means other than a plasma torch or electric arc are possible and even advantageous when the crucible is made of an insulating material, in which case heating can be by induction or radiation (laser).

Note also that the melting point of some substances can be lowered by adding fluxes, inter alia metal oxides or salts having a low melting point. Examples of such fluxes are alkali-metal oxides and carbonates, chlorides, nitrates, etc. The fluxes can subsequently be eliminated from the fibres by washing in water.

As stated, in the method according to the invention, the molten pool of material is set in motion with respect to the extractor disk so that the material in contact therewith is constantly replenished in liquid form having sufficient fluidity to form a thin film by solidification at the surface of the disk edge. In the embodiment described hereinbefore, the pool is moved by rotating the crucible holding it. However, other means of moving the pool are also possible, e.g. using an agitator or a vaned accelerator pump. In some cases it may only be necessary to drive the surface of the liquid by a stream of gas, inter alia the gas from the plasma torch. It is important, however, that the gas should not form a crust at the surface of the pool, since this will slow down the rotation of the disk and interfere with the formation of a homogeneous film in contact therewith. Note also that the geometrical parameters of the resulting fibres depend not only on the temperature and viscosity of the molten pool but also on the speed of rotation of the disk and the depth to which it is immersed. These factors can be suitably adjusted for obtaining fibres or particles having various textures and particle sizes and shapes varying from a long fibre to a compact quasi-spherical particle.

Various tests made in accordance with the present method have shown that the main factor to be adjusted for efficient operation is the fluidity of the bath in contact with the disk. The fluidity is directly related to the heating and temperature of the pool. If the pool is too thick in contact with the disk, i.e. if it exceeds about 50 to 100 P, the film does not form properly. If the pool is too fluid, a film will form but in that case the operating conditions (temperature, energy consumption) become restrictive and uneconomic. It is therefore necessary to make a compromise between these extremes and the compromise will differ in each particular case depending on the nature of the filamented material and the melting point thereof. The device is very versatile in this respect since the parameters can be varied within very wide limits by modifying elements such as the dimensions of the crucible and extractor disk, the rate of cooling, the nature and power of the heating means, the distance between the torch and the extraction area and the angle thereof with respect to the crucible, the speed of rotation of the crucible and the disk, etc. In general, the torch consumed from 30 to 100 A at 50 V to 100 V and was directed at an angle of 30° to 40° to the plane of the disk.

With regard to the speed of rotation of the disk, if it is too high the material in the film will not have time to solidify completely on contact before the place of expulsion, in which case the product will consist of compact particles rather than fibres.

In general, the centrifugal force of explusion applied to an element of a film adhering to the disk, the element having a length dl and a cross-section A, is as follows:

$$dF = dm v^2 / R,$$

where $dm = \alpha \, A dl$ ($\alpha$ being the density of the film material). Putting $10^{-3}$ mm for dl, we obtain for dF a value of $25 \times 10^{-8}$ N/mm, which shows that the peripheral speed of the disk must be relatively high, e.g. of the order of 20 m/sec or more. If desired, however, the speed can be reduced if the disk is vibrated at sonic or ultrasonic frequency simultaneously with rotation. The vibration reduces the residence time of the film in contact with the disk and facilitates expulsion thereof. Vibration should not be excessive, however, since it tends to break up the film into very small particles.

The following examples illustrate the invention.

EXAMPLE 1

A device similar to that described with reference to FIG. 2 was used, comprising a copper crucible 7 cm in diameter, cooled in water and containing about 5 g of molten zirconium oxide at a temperature of about 3000° C. Operation was in air, using a plasma torch 20 mm in diameter placed at 30° to the disk and focused on an area of the molten pool at 0.6 to 0.8 mm from the place of contact between the disk and the pool. Operation was at 90-100 V at 70 A with a flow rate of argon of 1 l/min. The speed of rotation of the crucible was 2 rpm.

The extractor disk was a copper disk cooled with water and 122 mm in diameter and having a peripheral area 2 mm thick. The disk rotated at a peripheral speed of 6.3 m/sec. The resulting $ZrO_2$ fibres were 200-300 μm wide, 20-30 mm long and about 20 μm thick, the output being approximately 100 g/min. FIG. 6 is a microphotograph of these fibres.

Note that in this example and in others where non electrically-conductive oxides were filamented, the material was first melted by an internal arc torch (non-transferred arc) i.e. where the potential is applied between the central electrode and the outer walls of the nozzle, between which elements the arc occurs. Once melted, the pool increases the conductivity and the potential can then be applied between the electrode and the crucible so that the arc is produced between the electrode and the molten pool.

EXAMPLE 2

The method was the same as in Example 1, using the same apparatus and under the same conditions with alumina (melting-point about 2300°). As before, fibres were obtained at a peripheral speed of 6.3 m/sec., but were accompanied by a proportion of powder in particles between 80 and 300 μm in diameter. When the peripheral speed was reduced by about 10-20%, the proportion of powder mixed with the fibres was reduced.

EXAMPLE 3

Operation was the same as in Example 1, using a 1:1 mixture (by weight) of alumina and zirconium dioxide at 80 A and a disk peripheral speed of 7.8 m/sec. In this case, only powders of particle size 100-500 μm were obtained.

EXAMPLE 4

The procedure was the same as in the preceding examples, using a sanding powder (mixtures of silicoaluminates) under the following conditions: melting-point ~ 2500° C.; flow rate of Ar 0.5 l/min, current 50 A, peripheral speed of disk 2.8 m/sec. The result was an excellent yield of fibres 50-100 μm wide, 30-50 μm thick and 20-40 mm long.

EXAMPLE 5

The procedure was the same as in the examples using rock wool (M.P ~ 2000° C.) as raw material. The operating conditions were as follows: current 50 A, flow rate of Ar 1 liter/min; peripheral speed of disk 3 m/sec. All other parameters as in Example 1. Fibres 10 μm wide were obtained mixed with powder.

EXAMPLE 6

Operation was as described in Example 1, using magnetite and varying the following parameters: extraction disk diameter 75 and 122 mm; peripheral speed from 2.2 to 16.7 m/sec. Speeds of rotation of crucible: between 1 rpm and 5 rpm. Torch current between 40 A and 100 A. The following results were obtained in a test under the following conditions: 80 V; 40 A; distance between torch nozzle and extraction area, 10 mm; flow rate of gas, 20 l/min; temperature 3500°±200° C.; depth of molten pool 3 mm; disk diameter 122 mm; material of disk Al:

| peripheral speed (m/sec) | 3.4 | 4.7 | 5.2 | 6.8 | 7.8 |
|---|---|---|---|---|---|
| Cross-section of fibres (um) | 100 | 100 | 80 | 80 | 50 |

When the disk of Al was replaced by a corresponding disk of Cu, 70 μm fibres were obtained at 4.7 m/sec.

When the current was reduced from 40 to 10 A (by reducing the voltage), particles of about 200 μm instead of fibres were obtained at a speed of 3.4 m/sec.

The preceding results show, firstly, that an increase in the extraction speed results in a decrease in the thickness of the film deposited on the edge of the disk, and secondly that a increase in dissipated power (a temperature drop and increase in the viscosity of the molten pool) results in fragmentation into short particles rather than long fibres. These findings indicate that the variation in results is directly related to the wettability of the disk by the molten pool, the wettability being reduced by the following parameters: (1) an increase in peripheral speed of the extraction disk; (2) replacement of one disk material (Al) by another (Cu) and (3) reduction of the temperature of the pool, with consequent increase in viscosity.

With regard to the heating techniques using an electric discharge (arc or plasma torch) between an electrode and the pool in the crucible, through which the discharge travels, the following should be noted. When the length of the arc [the distance between the electrode (cathode) of the heating device and the surface of the molten pool] is small, a potential drop (Vp) across the pool (at high potentials the discharge normally travels through the molten pool when the crucible operates as an anode) has the effect of increasing the efficiency of heating by a value of 0.30 Vp (as a percentage).

This effect is appreciable since, at reduced voltage, the heat released by the Joule effect into the molten pool more than makes up for the loss in heating efficiency (due to reduction in voltage) from the arc transported to the anode.

It has been found that in the case of an installation as used according to the invention and capable of supplying 300 A at 100 V, the increase in efficiency due to the aforementioned effect is expressed by a value of 90 $R_p$, where $R_p$ defines the internal resistance of the molten pool as follows:

$$R_p > \frac{0.3\,rd}{D^2}$$

In this relation, r is the specific resistivity of the molten material (Ω .cm) d is the thickness of the pool (cm) and D is the diameter of the crucible (cm).

Consequently, using the aforementioned two equations, it can be seen that in this case, the percentage increase in heating efficiency is greater than $$\frac{100\,rd}{D^2}$$

and can become significant if r is not too small and if $d/D^2$ is given a sufficient value.

Allowing for the specific resistivities of the materials to be filamented, some of which are shown in the following list it can be seen e.g. in the case of zirconium dioxide that appreciable effects are obtained with a crucible about 5 cm in diameter and a thickness of 1 mm or more of reduced metal.

| Material | | Resistivity (Ω · cm) |
|---|---|---|
| $Al_2O_3$ | | $10^2$ |
| $ZrO_2$ | | $10^{-1}$ |
| $SiO_2$ | | $10^2$ |
| BN | | 1 |
| $CrO_2$ | > | $10^5$ |
| $B_2O_3$ | > | $10^6$ |
| WC | > | $10^7$ |

By way of example, the following is a very incomplete list of mineral compounds capable of being fragmented by the method according to the invention. The table also gives the melting temperature and the approximate viscosity in poises at this temperature. Note that in the case of some of these materials, the viscosity is relatively low at the melting point (between 1 and 100 poises) and consequently it is not necessary for the temperature of the molten pool to be greatly above the melting point. The case is different with the second group of materials where the viscosity at the melting point exceeds 1000 P. These very viscous materials have to be heated appreciably above the melting point to bring the viscosity to within acceptable limits.

| Material | M.P. °C. | Viscosity (P) |
|---|---|---|
| $Bi_2O_3$ | 800 | <10 |
| $Al_2O_3$ | 2050 | 0.05 |
| $Ga_2O_3$ | 1900 | <10 |
| $MoO_3$ | 800 | " |
| $SeO_2$ | 350 | " |
| $V_2O_5$ | 700 | " |
| $WO_3$ | 1500 | " |

-continued

| Material | M.P. °C. | Viscosity (P) |
|---|---|---|
| $ZrO_2$ | 2700 | " |
| $TeO_2$ | 450 | 0.7 |
| $SiO_2$ | 1700 | $17.10^6$ |
| $CeO_2$ | 2600 | $7.10^5$ |
| $B_2O_3$ | 450 | $10^5$ |
| $Sb_2O_3$ | 650 | $>10^4$ |
| $Si_3N_4$ | 1900 | — |

EXAMPLE 7

A device similar to that described in Example 1 was used, but installed in a compartment protected by an inert gas (argon). A pool of liquefied tungsten carbide kept at about 3200° was filamented, using a copper disk cooled with water and driven at a peripheral speed of 6.5 m/sec. Operation was at 100 V and 80 A. The resulting particles of WC had an average size of about $\mu m$.

We claim:

1. A method of producing solidified filament, fibre or particle from a pool of a molten material by the melt extraction technique including rotating a heat extracting disk having a narrow peripheral surface, immersing the peripheral surface into an immersion area in the pool to form a film of the material on the peripheral surface and at least partially solidfying the film on the peripheral surface, and projecting the at least partially solidified film by centrifugal force from the disk as a filament, fibre or particle wherein the improvement comprises
    additionally heating a portion of the melt pool surface remote from the disk immersion area sufficient to produce a lower-viscosity region of the melt, and moving the lower-viscosity region into the disk immersion area.

2. The method of producing solidified filament, fibre or particle from a pool of a molten material as in claim 1 wherein the method further includes maintianing the pool with a molten material having a viscosity in the range of from a few poise to a few hundred poise.

3. The method of producing solidified filament, fibre or particle from a pool of a molten material as in claim 2 wherein moving the lower-viscosity region into the disk immersion area comprises rotating the melt pool relative to the disk.

4. The method of producing solidified filament, fibre or particle from a pool of a molten material as in claim 2 including heating a portion of the melt pool surface remote from the disk immersion area by electric arc or plasma torch.

5. The method of producing solidified filament, fibre or particle from a pool of a molten material as in claim 2 including heating a region of the melt pool surface at a distance of about 5 to 10 cm from the disk immersion area.

6. Apparatus for producing solidified filament, fibre or particle from a pool of a molten material by the melt extraction technique comprising
    means for maintaining a pool of molten material,
    a rotatable, heat extracting disk having a narrow peripheral surface for immersing into an immersion area in the pool forming a film of the material on the peripheral surface, for at least partially solidifying the film on the peripheral surface, and for projecting the at least partially solidified film by centrifugal force from the disk as a filament, fibre or particle,
    means for additionally heating a portion of the melt pool surface remote from the disk immersion area sufficient to produce a lower-viscosity region of the melt, and
    means for moving the lower-viscosity region into the disk immersion area.

7. The apparatus for producing solidified filament, fibre or particle from a pool of a molten material as in claim 6 which comprises
    means for maintaining the pool with a molten material having a viscosity in the range of from a few poise to a few hundred poise.

8. The apparatus for producing solidified filament, fibre or particle from a pool of a molten material as in claim 6 wherein the means for moving the lower-viscosity region into the disk immersion area comprises means for rotating the melt pool relative to the disk.

9. The apparatus for producing solidified filament, fibre or particle from a pool of a molten material as in claim 6 wherein the means for additionally heating a portion of the melt pool surface remote from the disk immersion area comprises an electric arc or plasma torch.

10. The apparatus for producing solidified filament, fibre or particle from a pool of a molten material as in claim 6 wherein the means for additionally heating a region of the melt pool surface is a plasma torch directed at an angle of 20°–60° with the plane of the disk, such that the region at which the ionized gases from the torch heat the pool surface is at a distance of about 5 to 10 cm from the disk immersion area.

* * * * *